(No Model.) 4 Sheets—Sheet 3.
P. K. STERN.
ROLL HOLDING CAMERA.
No. 566,100. Patented Aug. 18, 1896.
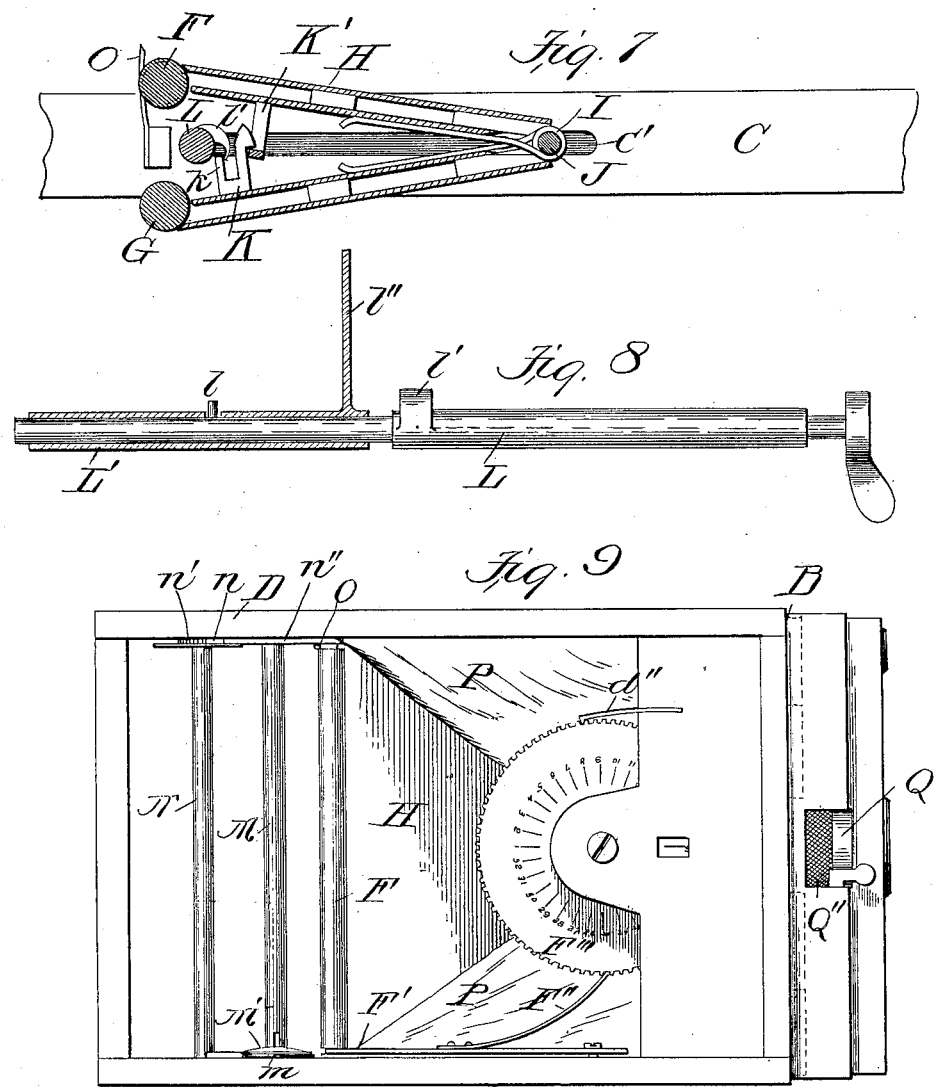
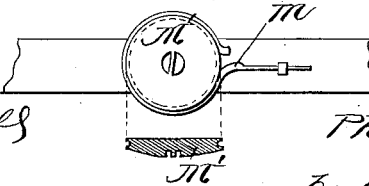
Witnesses
F. R. Cornwall
Hugh H. Wagner
Inventor
Philip K. Stern
by Paul Bakewell
his atty.

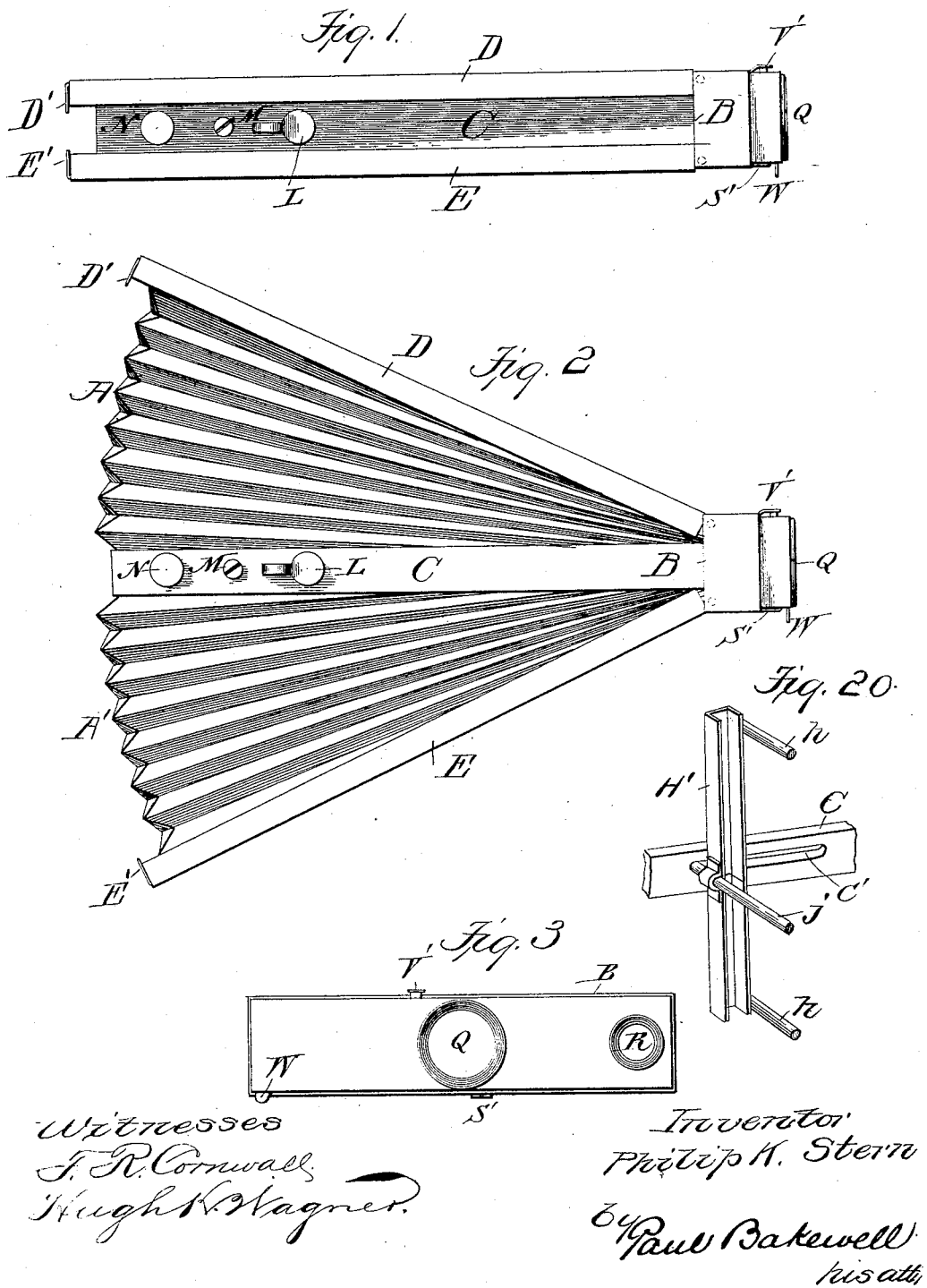

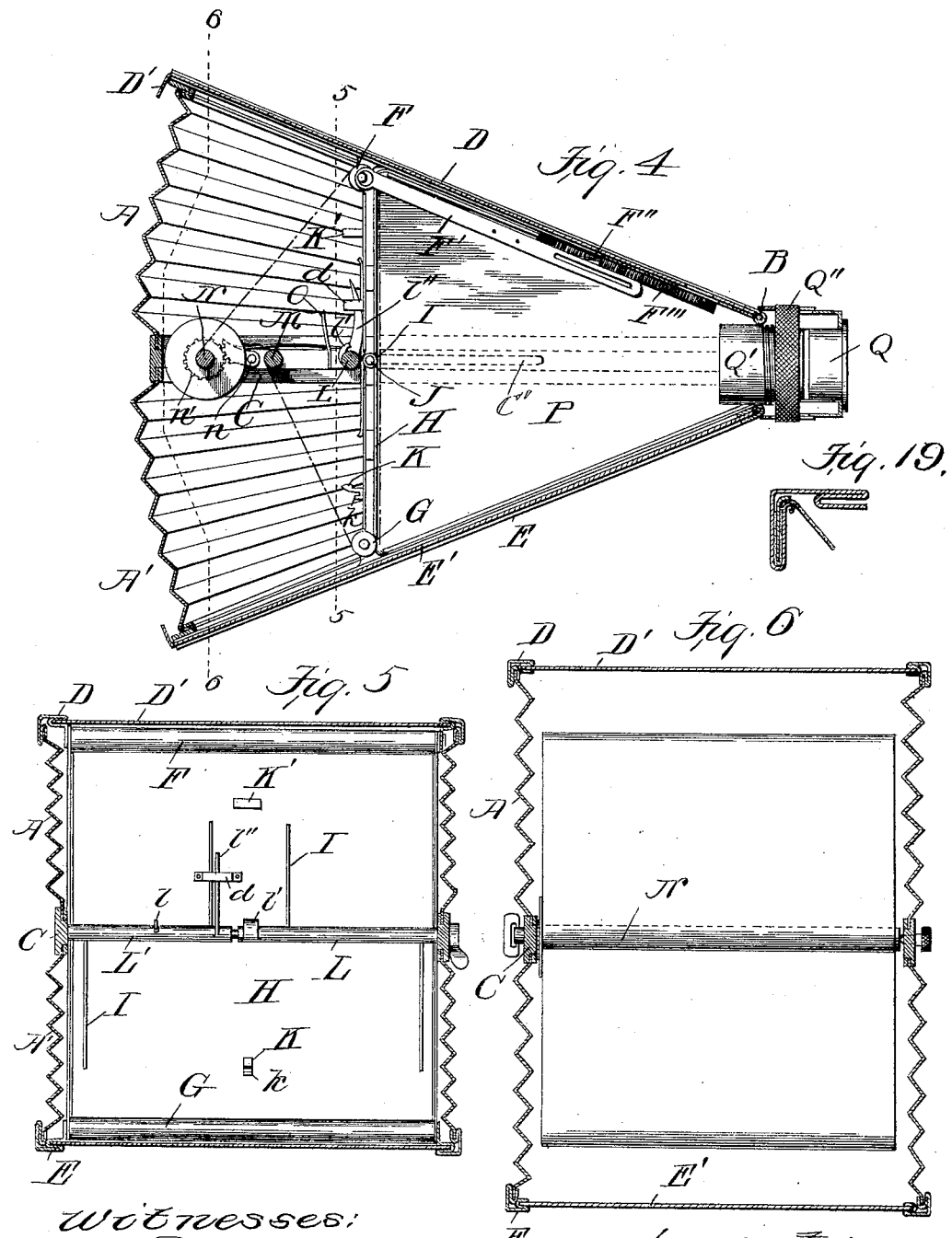

(No Model.) 4 Sheets—Sheet 4.
P. K. STERN.
ROLL HOLDING CAMERA.
No. 566,100. Patented Aug. 18, 1896.
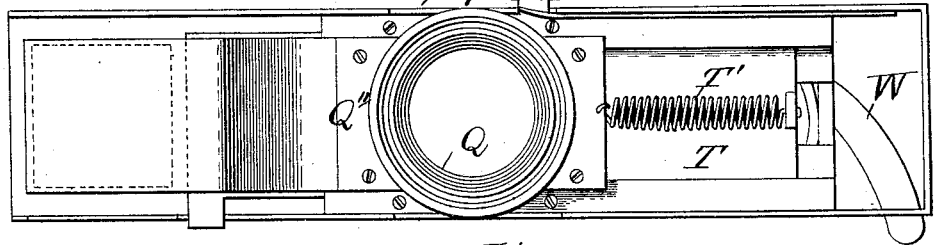
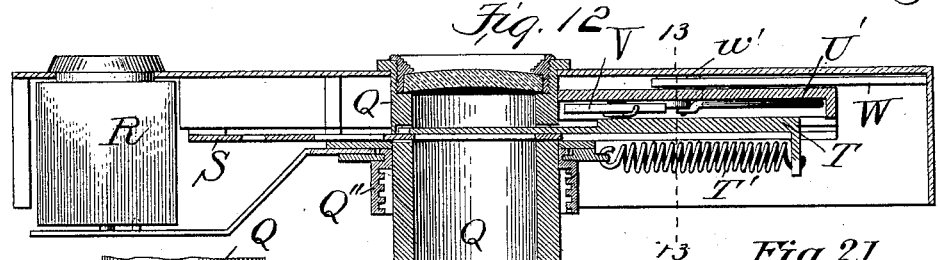
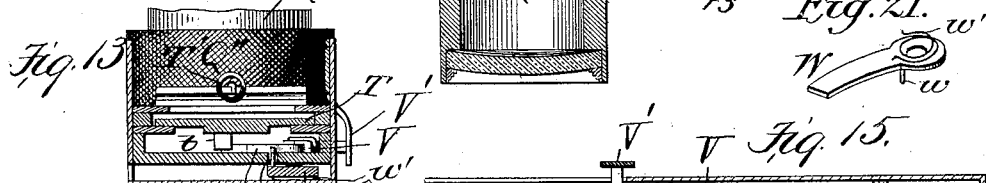
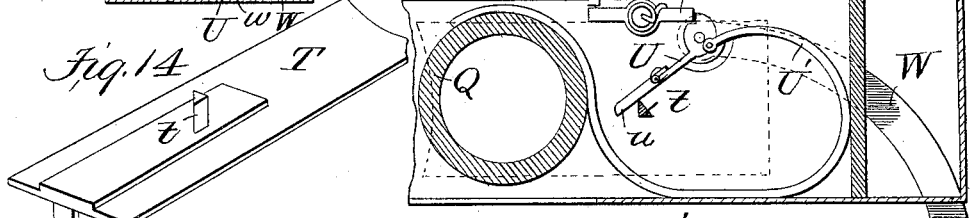
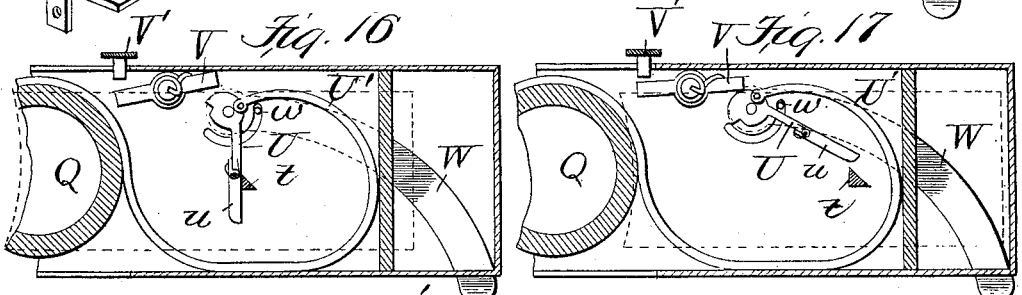
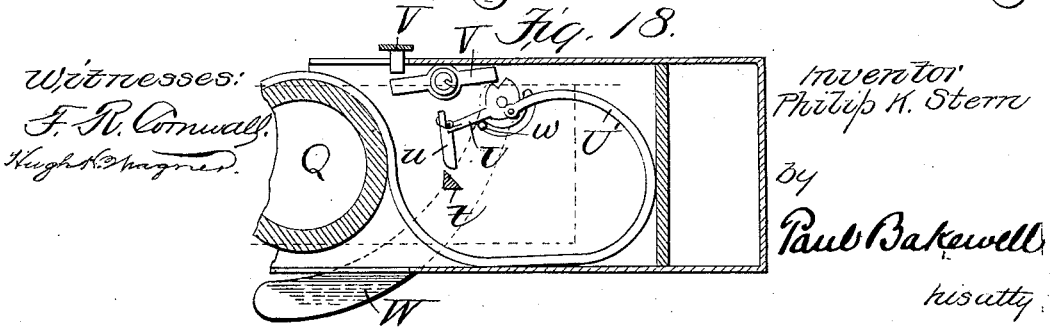
Witnesses:
F. R. Cornwall
Hugh K. Wagner
Inventor
Philip K. Stern
by
Paul Bakewell
his atty.

UNITED STATES PATENT OFFICE.

PHILIP K. STERN, OF ST. LOUIS, MISSOURI, ASSIGNOR TO THE STERN MANUFACTURING COMPANY, OF MISSOURI.

ROLL-HOLDING CAMERA.

SPECIFICATION forming part of Letters Patent No. 566,100, dated August 18, 1896.

Application filed July 11, 1895. Serial No. 555,611. (No model.)

*To all whom it may concern:*

Be it known that I, PHILIP K. STERN, a citizen of the United States, residing at the city of St. Louis, State of Missouri, have invented a certain new and useful Improvement in Cameras, of which the following is a full, clear, and exact description, reference being had to the accompanying drawings, forming part of this specification, wherein—

Figure 1 is a side elevational view showing my improved camera in a folded position. Fig. 2 is a similar view showing the camera unfolded and ready for operation. Fig. 3 is an end view looking at the front of the camera. Fig. 4 is a sectional elevation through the camera when open, the near side wall being removed to show the interior. Fig. 5 is a cross-sectional view on line 5 5, Fig. 4. Fig. 6 is a cross-sectional view on line 6 6, Fig. 4. Fig. 7 is an enlarged view of the sectional partition or folding platen. Fig. 8 is an enlarged view of the platen-controlling rod. Fig. 9 is a top plan view of the camera in a folded position, showing the manner of operating the index-wheel. Fig. 10 is a detail view of the brake-disk for the unexposed-film roller. Fig. 11 is an elevational view of the lens and its associate parts, looking from the inside. Fig. 12 is a sectional view through the same. Fig. 13 is a sectional view on line 13 13, Fig. 12. Fig. 14 is a detail view of the shutter. Fig. 15 is a sectional view showing the operating-arm of the shutter in position to throw the same. Fig. 16 is a similar view showing the position of the parts when the arm is throwing the shutter. Fig. 17 shows the arm releasing the shutter. Fig. 18 shows the arm engaging the shutter for another operation. Fig. 19 is a modification of the hinged swinging frame. Fig. 20 is a modification showing the adaptation of my camera to receive a plate-holder. Fig. 21 is a detail view of the pivot end of the cocking-lever, showing the pin for operating the shutter-actuating arm and a spring for returning said cocking-lever to its normal position.

This invention relates to a new and useful improvement in photographic cameras which are designed especially to be folded within a small compass to enable them to be carried conveniently.

The features of invention reside, briefly, in the construction and arrangement of the folding envelop or casing and its associate parts, in the novel construction and operation of the shutter, and in the novel construction, arrangement, and combination of the several parts, all as will hereinafter be described, and afterward pointed out in the claims.

In the drawings, A and A' indicate two folding sections which move toward and from each and at an angle to the optical axis of the lens. These sections are hinged to each other at one side or are hinged to the lens-plate, as the case may be, and in their movement swing from a fixed point, the free ends necessarily having the greatest movement. This construction permits the box to be opened and closed like a fan, as shown in Figs. 1 and 2.

B indicates what I have termed the "lens-plate," which is provided with a lens-tube, in which the lens operates, as in focusing, &c. Extending rearwardly from this lens-plate is a central framing C, in which the film-rollers, &c., are mounted, and to which the edges of the bellows are connected in any suitable manner.

D and E are the swinging frame-pieces to which the bellows are connected, said frames being of any suitable construction and having means provided to receive sliding plates D' and E', which form two walls of the box. These parts and their connections are made light-tight for obvious reasons.

In Fig. 19 I have shown an approved form of frame, in which the same is folded to receive the sliding plates, the depending fold being to receive the end of the bellows. The bellows, as will be seen, is bent upon itself and is held in place by an angle-strip, which prevents the bellows pulling out.

Mounted on the frame-pieces D and E are guide-rollers F and G, on the axles of which are pivoted the sections of a hinged partition or platen H. At the joint between the sections of this platen a torsion spring or springs I are arranged, whose tension is to constantly straighten the platen which acts as a brace to keep the box open. The contiguous edges of the platen are preferably mounted upon a rod J, which forms the pivot-point therefor, said rod extending out at the sides into grooves C' in the frames C, in which it runs in the movement of the platen to guide the platen and keep the same perpendicular to the principal axis of the lens when the same is in operation.

To secure the box in a closed position without the use of external fastenings, which would be liable to catch in the carrier's pocket, I mount a lock on the inner faces of the sections of the platen, comprising the two parts K and K', the former being the nose of the lock and having formed thereon a projection $k$, with which engages a projection on a tripping and controlling rod for the platen. This rod, as shown in Fig. 8, is formed in two sections, L being the male section and mounted in the frame C, its end projecting outside of the frame and provided with a winged button by which the rod is operated, and L' a female section or sleeve, which receives the male section and is operated by said male section by a slot-and-pin connection $l$, which permits lost play between the parts.

$l'$ indicates a projection on the male section, which engages the projection $k$ of the nose of the lock, and by a rotary movement causes said nose to become disengaged from its eye. This is permissible by reason of the fact that the inner platen-plates are yielding, and the parts of the lock being secured to these are easily operated, as above described.

It is of course understood that no manipulation of the rod L is necessary to cause the lock to secure the platen-sections together, as they do this automatically when the sections are brought close enough together for the coöperating parts of the lock to register with each other.

Projecting from the female section L' of the rod is a finger $l''$, which is adapted to engage an eye $d$ on one of the platen-sections to bring said sections to the same plane, as shown in Fig. 4, or to break the joint between said sections, depending upon the direction in which the rod is turned—that is, when the projection is turned toward the front of the camera it forces the middle portion of the platen forwardly, enabling the camera to be folded.

Mounted in the frame C, behind the platen, are two rollers M and N, M being the roller from which the unexposed film is unwound, and N the roller upon which the exposed film is wound. Roller M has one of its ends bifurcated, as shown in Fig. 9, which bifurcation receives a cross-piece of disk M', Fig. 10, whose periphery is grooved and affords a seat for an encircling spring $m$, which acts as a brake. This spring $m$ is flattened at its straight end, so as to yieldingly hold the disk in place, permitting a lateral movement relative to the framing C. Roller N is provided at one end with means for rotating the same, and is also provided with a ratchet-and-pawl mechanism to prevent a back or return movement of the roller after the film has been wound thereon.

This ratchet-and-pawl mechanism is best shown in Figs. 4 and 9, in which the ratchet $n'$ is mounted on the roller N, and the pawl which engages said ratchet is mounted on the framing C. To normally hold the pawl in position to engage the teeth of the ratchet, I provide a spring $n''$, which is secured to framing C, its other or free end bearing upon the pawl.

Rollers M and N are so constructed as to be easily removed from and inserted in the camera, and are provided with means for the attachment of the film.

O indicates a pointed projection secured to the frame C, which, when the camera is closed, punctures the film and indicates the several exposures on the film should the camera be closed after exposure.

To properly space the film on the platen, so that the operator can tell when the exposed film-roller has wound up a sufficient quantity of film, and also to count the number of exposures, I mount eccentrically on roller F a pitman F', which is provided with a yielding tooth F'', engaging teeth on a counting and indicating wheel F''', as shown in Figs. 4 and 9. A counter-pawl $d''$ is provided for the opposite side of the wheel to counteract the dragging effect of the pawl F''. When the exposed film is being wound up, it passes over roller F, and, rotating the same, actuates the pitman, which in turn reciprocates its tooth F'' and forces the counting-wheel F''' around step by step. This counting-wheel is provided with indicating points and numbers, one point and number of which is exposed through an opening in the plate D' and indicates the position of the film as well as the number of exposures. Secured to the side edges of the platen, the frames D' and E, and the lens-plate are supplemental inner walls P, which not only afford extra protection against the light in the front compartment of the box, as shown in Fig. 4, but prevent the light in the front compartment from entering the rear compartment during an exposure, and which, when the box is folded and the platen is projected forwardly, fold down over the platen, as shown in Fig. 9, retaining the film in place, keeping it taut.

The lens and its associate parts are illustrated more fully in Figs. 11 to 18, and as there shown are mounted in a box or frame, which slides and telescopes in the lens-tube in plate B. The lens-tube Q fits in a tube Q', secured in the plate B, and the lenses are focused on the film by means of a threaded collar Q'', which engages threads in the tube Q', as shown in Fig. 4. The focus for different distances of the object, having been previously ascertained, are marked on the sliding part of the lens-box, and the lens is focused according to this scale. This collar also serves to hold the frame or box in which the lens and its associated parts are mounted in position.

R indicates a finder.

S indicates a sliding diaphragm-plate provided with different-sized openings, which plate passes through the lens-tube Q and is held in position in any desirable manner. This plate is preferably provided with an extension S', which projects outside the box, and by which the plate may be easily operated. I also prefer to arrange an index in connection with this extension S', whereby the proper position of the openings in the diaphragm may be readily determined.

T is the shutter which normally closes the lens-tube, and is held in its normal position by a spring T', as shown in Figs. 11 and 12. This shutter slides in suitable grooves, and has projecting from its under side a pin $t$.

U is a swinging arm mounted at one side of the lens-frame, which is adapted to engage the pin $t$ and force the shutter to one side, so that it will unclose the lens-tube. Arm U is impelled in this movement by a spring U', whose extension exceeds that of spring T', and when the arm, moving in its arc, escapes the pin $t$, the shutter is actuated in a reverse direction by spring T' and closes the lens-tube. It will thus be seen that the exposure is accomplished by a rapid opening and closing of the lens-tube, the shutter moving in two directions.

The arm which moves the shutter to open the lens is formed with a notch, in which a trigger V seats itself when the arm U is cocked. This trigger is provided with a spring whose normal tendency is to force the trigger in contact with the arm. This trigger is actuated by a yielding finger V', which projects up through the frame.

To set the arm U, I mount on its pivot a cocking-lever W, which is provided with a pin $w$, which projects in the path of the arm, and when the cocking-lever is moved to one side, as shown in Fig. 18, the pin forces the arm toward the lens-tube, as shown. The arm U is provided with a yielding hinged section or dog $u$, which permits the arm to escape the pin $t$ when the cocking-lever is actuating it. When the arm is set and in position to actuate the shutter, a torsion-spring $w'$ (shown in Fig. 21) returns the cocking-lever to its original position and removes the pin $w$ out of the immediate path of the arm. To trip the arm and actuate the shutter, it is only necessary to press the projection V' and release the trigger V from the notch in the arm, when the spring U' will swing the arm on its pivot, as shown in Fig. 16, moving the shutter laterally and opening the lens-tube. This movement continues until the arm escapes the projection $t$, at which time the lens-tube is fully open, as shown in Fig. 17. Spring T' now acts upon the shutter and closes the tube.

The operation of the shutter, as above described, is very rapid and is used for taking snap-shots or quick exposures. It is, however, sometimes desirable to take time exposures, and to do this it is only necessary for the operator to so hold the cocking-lever that its pin $w$ will prevent the arm U from escaping past the pin $t$. When this is done, the shutter leaves the lens-tube open until the cocking-lever is returned to its original position, when the arm U will escape pin $t$ and the shutter will close.

In Fig. 20 I have shown a slight modification of the hinged partition, in which the camera may receive a plate-holder instead of film. In this construction H' indicates a guideway, hinged in its middle on a rod $j$, which runs in a recess in frame C, said guideway being also hinged to the folding frames by rods $h$. The plate D' in this construction would be formed with a slot through which the plate-holder could be inserted or removed.

I am aware that many minor changes in the construction, arrangement, and combination of the several parts of my invention may be made and substituted for those herein shown and described without in the least departing from the nature and principle of my invention.

Having thus described my invention, what I claim, and desire to secure by Letters Patent, is—

1. A camera-box, comprising a lens-plate, folding frames hinged to said lens-plate, flexible walls arranged between the sides and back of said frames, and a hinged brace for said frames in the form of a platen or partition, which divides the box into compartments; substantially as described.

2. The combination with the lens-plate, of hinged frames mounted thereon, flexible walls at the sides and back of the hinged frames, and a partition or platen which braces said hinged frames, and divides the box into two compartments, the front containing the film to be exposed, and the rear, the unexposed and exposed films; substantially as described.

3. The combination with the lens-plate, of a rigid frame extending rearwardly therefrom, folding frames hinged to the lens-plate, flexible walls between the folding frames and rigid frame, rollers mounted in the rigid frame for the film, and a brace within the box and between the folding frames, said brace being located in front of the film-rollers and acting as a platen for the film; substantially as described.

4. The combination with the lens-plate, of a rigid frame extending rearwardly therefrom, folding frames hinged to the lens-plate, flexible walls between the folding frames and rigid frame, rollers mounted in the rigid frame for the film, and a brace within the box and between the folding frames, said brace being hinged at its middle, the pivot-rod thereof extending laterally into guiding-slots in the rigid frame, and a pivotal connection between the ends of the brace and the folding frames; substantially as described.

5. A camera, comprising a lens-box, a frame extending rearwardly therefrom, folding frames hinged to the lens-box, bellows arranged between the several frames, a sectional platen, which is hinged to the swinging frames, the sections of said platen being hinged together, and a rod at the platen-hinge, which works in a recess in the stationary frame to guide the platen in its movement; substantially as described.

6. The combination with a lens-plate, of a rigid frame extending rearwardly therefrom, sections hinged to said lens-plate and folding upon said frame, a hinged platen mounted on the folding frame, a lock on the platen-sections for securing them in a closed position, and a sectional rod mounted in the rearwardly-extending frame for releasing the lock said rod being also adapted to lock the platen in its open position; substantially as described.

7. A camera, comprising folding sections, a sectional platen which is operated by said sections, a lock on the sections of the platen, and a controlling-rod for said lock which rod passes transversely the camera; substantially as described.

8. The combination with folding sections, of a hinged platen, a lock on the platen for securing the sections in a closed position, a sectional rod for releasing the lock, said rod locking the platen in its open position; substantially as described.

9. The combination with a folding platen, of a lock for the same, a rod for releasing the lock to permit the platen to open, said rod having a projection, which locks the platen in an open position; substantially as described.

10. The combination with a folding platen, of a lock for securing the same in its folded position, a rod comprising a male and female section operatively connected together by a slot-and-pin connection, a nose on the male section for unlocking the platen-lock, and a projection on the female section for breaking the joint in the open platen; substantially as described.

11. The combination with guide-rollers, of a platen hinged to the axles thereof; substantially as described.

12. The combination with guide-rollers, of a platen hinged to the axles thereof, and rollers mounted in juxtaposition to the platen whereby the film on said rollers passes entirely around the platen; substantially as described.

13. The combination with folding frames, of bellows between, guide-rollers mounted in the frame, and a platen hinged to the axles of the guide-rollers; substantially as described.

14. A photographic camera, consisting of a collapsible envelop or casing for the sensitized material, a lens located at one extremity of said envelop for throwing the image on said sensitized material, a transverse reciprocating shutter for controlling the light which passes through the lens, a platen or backing for the sensitized material which platen is adapted to fold within the envelop, and rollers for the sensitized material located behind the platen; substantially as described.

15. A photographic camera, having a lens, folding frames hinged thereto, a folding partition or platen between the frames, guide-rollers mounted in the frames to which said platen is hinged, said platen being also hinged at its middle, and film-carrying rollers behind the hinged platen; substantially as described.

16. The combination with the lens-plate, of a rigid frame extending rearwardly therefrom, folding frames hinged to the lens-plate and adapted to fold on each side of the rigid frame, a partition hinged to the folding frames, and spools for the film mounted in the rigid frame behind the partition; substantially as described.

17. A photographic camera consisting of a lens and lens-plate, a shutter for the lens, frames hinged to lens-plate, a platen forming a film-support, hinged to the frame, means between the frames for excluding light, the said frames being adapted to fold equiangularly upon the optical axis of the lens whereby the platen is caused to assume an angular position relative to the optical axis of the lens, and means for traversing predetermined lengths of film successively across the platen; substantially as described.

18. The combination with the lens-plate, of a rigid frame extending rearwardly therefrom, folding frames hinged to the lens-plate and adapted to fold on each side of the rigid frame, a partition or platen hinged to the folding frames, accordion-plaited bellows arranged between the folding frames and rigid frame, and a supplemental flexible wall secured to the hinged platen and folding frames; substantially as described.

19. The combination with the lens-plate, of folding frames hinged thereto, bellows arranged between said frames, a partition hinged to the folding frames, film-rollers located behind the partition, the film being extended in front of the partition, and a supplemental casing for the front compartment; substantially as described.

20. The combination with a lens-tube, of a reciprocating shutter, a spring for normally holding said shutter in a closed position across the lens-tube, a spring-actuated swinging arm for engaging and forcing the shutter open against its spring, said shutter being closed by the shutter-spring, a lever for setting the swinging arm in an operative position, and a trigger for said arm; substantially as described.

21. The combination with the lens-tube, of a spring-pressed shutter, a projection on the shutter, a spring-pressed swinging arm provided with a dog on its end, which arm is adapted to force the shutter against the tension of its spring in one direction, said spring returning the shutter in the opposite direction, a trigger for releasing the swinging arm from a set position, and a cocking-lever for setting the arm; substantially as described.

22. The combination with the lens-tube, of a spring-pressed shutter, a spring-pressed swinging arm provided with a dog on its end, which is adapted to engage the shutter and force it against the tension of its spring in one direction, the shutter-spring returning the shutter in the opposite direction, a trigger for releasing the swinging arm, a cocking-lever for setting the swinging arm, and a diaphragm which is adjustable longitudinally the axis of the shutter; substantially as described.

23. In a photographic camera, the combination with a collapsible envelop or casing, of a suitable framework therefor, a lens located at one extremity of said envelop, a shutter for the lens, a platen or backing for the sensitized material which is adapted to fold within the envelop, and rollers for the sensitized material arranged behind the platen; substantially as described.

In testimony whereof I hereunto affix my signature, in presence of two witnesses, this 8th day of July, 1895.

PHILIP K. STERN.

Witnesses:
F. R. CORNWALL,
HUGH K. WAGNER.